United States Patent [19]

Corey, III

[11] 4,153,370

[45] May 8, 1979

[54] MICROINTERFEROMETER TRANSDUCER

[75] Inventor: Harry S. Corey, III, Oak Ridge, Tenn.

[73] Assignee: The United States of America as represented by the United States Department of Energy, Washington, D.C.

[21] Appl. No.: 857,650

[22] Filed: Dec. 5, 1977

[51] Int. Cl.$^2$ .............................................. G01B 9/02
[52] U.S. Cl. .................................. 356/358; 356/359
[58] Field of Search ................. 356/106 R, 109, 110, 356/113; 33/125 A, DIG. 4, DIG. 5, DIG. 21

[56] References Cited

U.S. PATENT DOCUMENTS 3,472,597   10/1969   Whitten, Jr. ..................... 356/106 R

FOREIGN PATENT DOCUMENTS 1373645   11/1974   United Kingdom ................ 356/106 R

OTHER PUBLICATIONS

George, "Linear Dimension Measurement" *IBM Technical Disclosure Bulletin*, vol. 15, No. 10, pp. 3195–3196, Mar. 1973.

*Primary Examiner*—John K. Corbin
*Assistant Examiner*—Matthew W. Koren
*Attorney, Agent, or Firm*—Dean E. Carlson; Stephen D. Hamel; David E. Breeden

[57] ABSTRACT

An air-bearing microinterferometer transducer is provided for increased accuracy, range and linearity over conventional displacement transducers. A microinterferometer system is housed within a small compartment of an air-bearing displacement transducer housing. A movable cube corner reflector of the interferometer is mounted to move with the displacement gauging probe of the transducer. The probe is disposed for axial displacement by means of an air-bearing. Light from a single frequency laser is directed into an interferometer system within the transducer housing by means of a self-focusing fiber optic cable to maintain light coherency. Separate fringe patterns are monitored by a pair of fiber optic cables which transmit the patterns to a detecting system. The detecting system includes a bidirectional counter which counts the light pattern fringes according to the direction of movement of the probe during a displacement gauging operation.

4 Claims, 2 Drawing Figures

MICROINTERFEROMETER TRANSDUCER

BACKGROUND OF THE INVENTION

This invention was made during the course of, or under, a contract with the United States Department of Energy.

This invention relates generally to the art of displacement transducers and more specifically to displacement transducer employing interferometric apparatus in combination therewith.

In the art, displacement transducers, especially for use with inspection machines for gauging surface contours of precision machined parts, it has generally been the practice to use linear varible differential transformer transducers (LVDTs). LVDTs are essentially null devices, and their high accuracy (in order of 0.000010-inches) deteriorates rapidly when they move from the null position. This situation develops when the part figure differs considerably from the sweep movement capability of the inspection machine. Therefore, it is desirable to have an inspection transducer with comparable accuracy to present LVDTs but extended range and linear response. Also, it is desirable to have any new transducer be of the same physical size of current LVDTs and be connected to support instrumentation by simple cabling.

Earlier attempts to combine an interferometric system with a displacement gauge became very complicated and difficult to operate and maintain a degree of accuracy capable of an interferometer system, due to the critical alignment of the necessary optical components to direct a laser beam into the measuring optics carried by the probe stem of a displacement gauge. This is especially true in the sweep gauge in which the displacement gauge is mounted on a sweep arm of an inspection machine to monitor the contour of a machined part. The accuracy of this gauging system was destroyed because of the unwieldiness of the sweep arm necessary to carry the laser optic system and maintain proper alignment of the optics to direct the laser beam into the displacement transducer. For example, as the arm was moved from the vertical position in a sweep toward a horizontal position the gauging force, which must be maintained constant in order to make very accurate inspection of machined parts would vary due to the vector shift in weight of the arm carrying the displacement gauge and the interferometer optics. This problem alone creates errors which are greater than the range of error in which the inspection was to be carried out.

Thus, there is a need to provide a displacement transducer or similar device capable of producing a linear signal over a wide range of displacement measurements which may be readily adapted to use as a conventional LVDT transducer in an inspection machine.

SUMMARY OF THE INVENTION

In view of the above need it is the primary object of this invention to provide a displacement transducer which has increased accuracy, range, and linearity over conventional displacement transducers.

It is a further object of this invention to provide a displacement transducer as in the above object wherein a microinterferometer transducer is provided employing fiber optic transmission of a coherent laser beam into a transducer housing containing an interferometric system for gauging movement of the displacement gauge probe in the measuring operation.

Other objects and many of the attendant advantages of the present invention will be obvious from the following detailed description taken in conjunction with the drawings.

DETAILED DESCRIPTION

Figure 1:
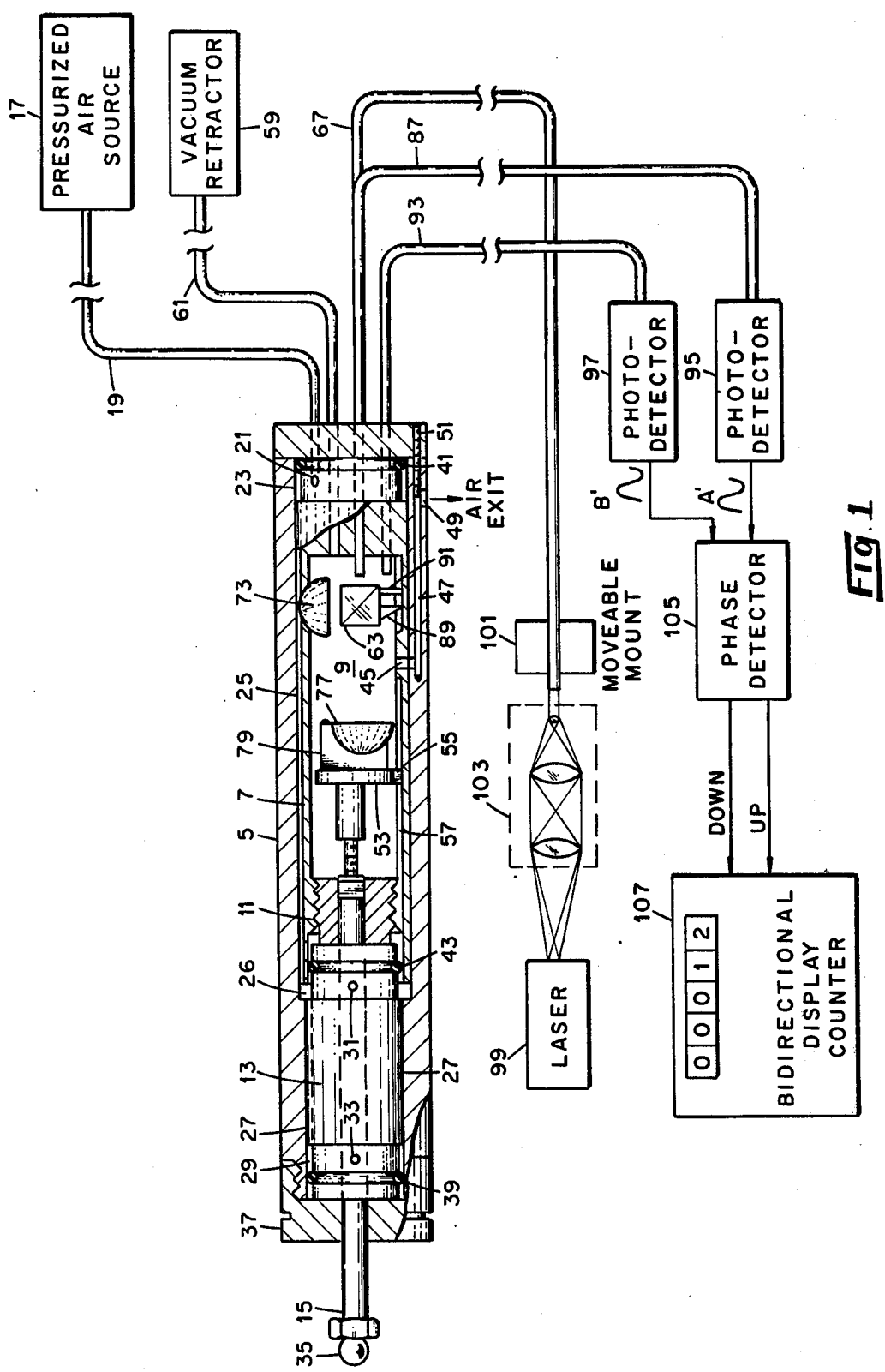
FIG. 1 is a detailed drawing of the microinterferometer transducer according to the present invention with the supporting system shown in schematic block form.

The preferred embodiment of the subject invention uses a conventional LVDT housing manufactured by Pheumo Precision Inc., Keene, New Hampshire. As illustrated in FIG. 1, the outer housing 5 encloses coaxially an inner housing portion 7 which is cylindrical in shape having a ½ inch OD and a 0.315 inch ID. The overall length of the outer housing 5 is approximately 3 inches. The inner housing 7 is provided with an inner bore forming a chamber 9. The front portion of the bore is threaded to receive a threaded stud portion 11 of an air-bearing assembly 13. A gauge probe 15 is mounted for longitudinal movement within the cylindrical air-bearing 13. A pressurized gas is supplied to the air-bearing from a pressurized air source 17 through flexible tubing 19 which enters the back end of the outer housing 5 and further extends through the back end of the inner housing 7 to an opening 21 which communicates with an air chamber 23. The air chamber is in fluid communication with air channels 25 formed by means of grooves along the outer portion of the inner housing cylinder 7 to feed the air to another chamber 26 and further through channels 27 to a front air chamber 29. The chambers 26 and 29 supply air to the inner bearing surface of the air-bearing through openings 31 communication with chamber 25 and openings 33 communicating with chamber 29.

The probe stem 15 is provided with a removable gauging tip 35. With the tip 35 removed the outer housing front end cover 37 may be removed from threaded engagement with the housing 5. O-ring seals 39 and 41 are provided at the front and back portions of the housing to seal the chambers 29 and 23, respectively. An additional o-ring seal 43 is provided at the rearward portion of chamber 26 which prevents passage of the pressurized air from chamber 26 into a chamber 9.

A portion of the pressurized air passing through the bearing to form the bearing surface exits the back of the bearing through the inner opening in the stud 11 through which the probe stem 15 passes into the chamber 9. Chamber 9 is provided with an exit port 45 which communicates with a channel 47 in the outer housing 5 to an exit port 49. A leakage of air from the back end of the bearing 13 into the chamber 9 is exhausted ffom the chamber through the exit 49. Various means may be employed to regulate the exhaust flow through passage 49, such as a flow restricting valve in the form of a set-screw 51. Set-screw 51 is threaded in the outer housing and extends into the passage 47 and may be partially or fully extended over the opening 49. By regulating the exhaust gas flow, the gauging force may be regulated. Gas pressure in the chamber 9 pushes against the shaft 15, which acts as a piston, to overcome the forces resisting displacement in the gauge head. The rearward end of the probe stem 15 is provided with a disc 53 which acts as a stop when the gauge head is fully extended. Further the disc 53 has a downward extending tab 55 which acts as an anti-rotation guide 10 and travels in an axial slot 57 formed in the inner diameter of the housing 7.

During the gauging operation, the gauge head is retracted by means of a vacuum retractor 59 connected in fluid communication with the chamber 9 by means of a flexible hose 61. The operator by applying the vacuum pulls the gauge head back to the retracted position which allows the insertion of parts and masters in a gaging operation as will be explained hereinbelow.

Figure 2:
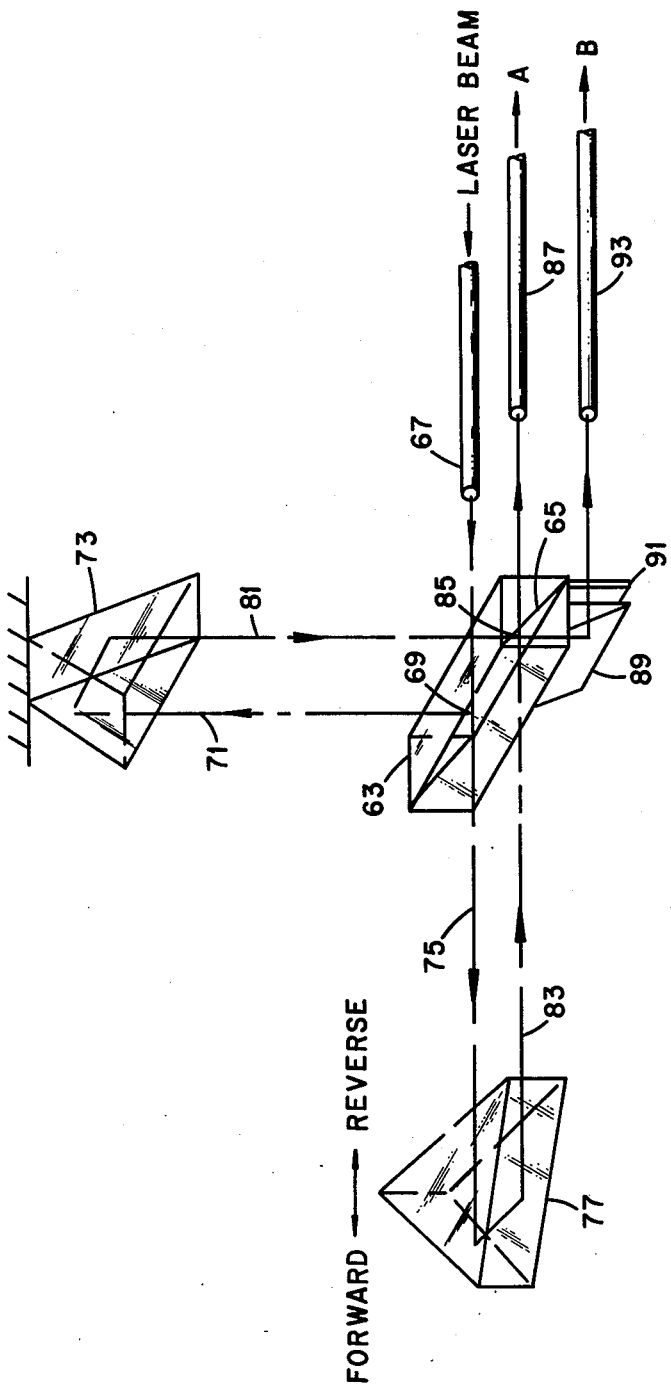
FIG. 2 is a schematic diagram of the interferometer optics mounted within the probe housing shown in FIG. 1.

Referring now to both FIGS. 1 and 2, the interferometer system employed with the gauge head arrangement to provide an accurate extended range displacement transducer will be described.

A beam divider cube 63 is disposed within the chamber 9 so that a 50% silvered reflective surface 65 divides an incoming laser beam via fiber optic cable 67 at a first point 69 in the divider cube 63. A portion of the beam 71 is reflected upward into a fixed-cube-corner reflector 73 and the unreflected portion 75 of the incoming beam is directed into a movable cube-corner reflector 77. The cube-corner 77 is mounted in proper optical alignment with the divider cube 63 by means of a holder 79 which forms an integral part of the stop disc 53. The reflected beams from the fixed-cube-corner 73 and the cube-corner 77, beams 81 and 83 respectively, are directed to interfere at a second point 85 in the beam divider cube 63 at the surface 65. These interfering beams form a fringe pattern as the cube-corner 77 is moved in a forward or reverse direction as indicated in FIG. 2. The beam divider cube 63 divides the fringe pattern into first and second fields of view. The first field of view is along the path of the reflected beam 83 and is directed into an output fiber-optic cable 87. The second field of view is along the path of a light beam 81 reflected from the fixed-cube-corner 73. However, due to limited space in the chamber 9 the second field of view or direction of the path of the fringe light pattern is turned 90° to exit toward the back of the chamber 9 by means of a turning prism 89 attached to the bottom of the beam divider cube 63 in the path of the second field of view of the fringe pattern beam extending from the bottom of the divider cube 63. Further, a one quarter phase plate 91 is provided in the path of the second field of view of the fringe pattern as it exits the chamber via a second output fiber-optic cable 93. The quarter-wave plate shifts the pattern one quarter of a wave length to essentially provide a phase shift in the light pattern of the second field of view. The light pattern (A and B) from the first and second fields of view are detected by photo detectors 95 and 97 which are connected via cables 87 and 93, respectively.

To introduce the laser beam from a single frequency laser source 99 into the transducer housing and maintain beam coherency, a self-focusing optical fiber cable 67 is used in which the beam may be transmitted along the conventional arm of a sweep gauge, for example, without affecting the function of the sweep arm of an inspection machine in which the transducer is used. The optical fiber cable used in the subject development is a self-focusing cable having a differential, cross-sectional index of refraction. One example of such a cable is the fiber-optic cable sold under the trademark SELFOC supplied by Nippon Electric Co., Tokyo, Japan. The light receiving end of the cable 67 is mounted by means of a movable mount 101 located remotely from the gauging arrangement in which the transducer is used. A matching lens system 103 is interposed between the laser output and the movable mount to focus the light to a small spot, collimate it, and to match it to the fiber-optic cable, while the adjustable mount is the mechanical device with which the input end of the cable may be adjusted to the optimum position for the injection of the light.

Typically the laser 99 is a Helium Neon type laser which produces a coherent monochromatic beam of 6328 A. By use of the self-focusing fiber-optic cable 67 the laser beam along with the focusing lens 103 and the movable mount 101 may be adjusted to efficiently transmit the laser beam and maintain its coherency into the beam divider 63 within the housing 5. The output cables 87 and 93 may be conventional fiber-optic cables, since these are only to carry the changing light intensity as the fringe patterns cross their fields of view.

Thus the outputs of the photo detectors 95 and 97 are essentially AC signals as the probe is moved, indicated as A' and B' corresponding to the A and B light signals. The outputs of the detectors 95 and 97 are connected to separate inputs of a phase detector 105. The phase detector 105 detects the leading one of the signals A' and B' and generates fringe counts by means of a pulse for each cycle of the light pattern as the fringe crosses the fields of view. As long as the A' signal is leading the B' signal, indicating purely forward movement, pulses are presented on an up output line and where the B' signal is leading, indicating reverse movement, pulses are provided on the down output line. The up and down output lines are connected to corresponding up and down count inputs of a bidirectional counter 107 which registers and continuously displays the net count of the up and down pulses. Thus the net count displayed by the bidirectional counter 107 is indicative of the displacement of the probe 35 relative to the fixed position of the housing 5 as monitored by the interferometer system.

In operation, the transducer is mounted in a reference location so that the probe tip 35 contacts a surface to be gauged. The gauging force is controlled by the position of the set screw 51 which regulates the air pressure in the chamber 9 from the rearward exit of the air from the air-bearing 13 into the chamber 9. When used in an inspection machine for inspecting the contour of a part for example, the housing 5 is mounted on the sweep arm of the machine in a position so that the probe tip 35 will contact the part surface. The operator then acitvates the vacuum retractor 59 which pulls the probe tip back into the housing so that the movable cube-corner 77 is in the fully retracted position. The laser 99 is activated and the light beam is transmitted through the cable 67 to the point 69 of the beam divider 63. The sweep arm of the machine is positioned so the transducer will contact a master when extended. The vacuum is released by the operator and the probe tip 35 moves forward to contact the master surface. The counter 107 is reset to zero and the vacuum retractor is activated. The part is positioned on the machine and the vacuum is released by the operator to allow the probe tip 35 to move forward to contact the part surface to be gauged. The interferometer generates the fringes as the cube-corner 77 moves and the net fringe count registered and displayed by counter 107 represents the distance moved by the probe from the master position to the position contacting the part surface.

As long as the probe moves in the forward direction the phase shift introduced in the second field of view of the interference fringe pattern by the quarter wave plate 91 causes the signal B to lag the signal A and thus the count pulses are presented to the up line of the counter 107. However if erratic movement of the probe is encountered as it is extended causing the fringe pattern to reverse due to a reverse movement of the cube-corner 77 the signal B will lead signal A and the corresponding count will bw presented on the down count input of the counter 107. As the gauge is moved over the contour of the part, the probe may move in and out but the interferometer in the same manner maintains the net displacement of the probe by the corresponding registry of the up and down counts in the counter 107. Thus the exact position of the probe tip 35 is constantly monitored to within an accuracy of one fringe distance for the full extendable range of the probe tip 35.

Although this invention has been described by way of a specific illustration and mode of operation it will be obvious to those skilled in the art that the illustrated transducer may be modified and used in different applications for extremely accurate displacement measurements especially over an extended linear range.

What is claimed is:

1. A microinterferometer displacement transducer, comprising:
    a longitudinally extending housing an opening extending therein toward a back portion of said housing;
    a cylindrical gas bearing disposed in said opening and forming a chamber in said housing between said bearing and said back portion of sais housing;
    1 a longitudinally extending gauge probe disposed for longitudinal displacement coaxially in said bearing and extending without said housing to contact a surface to be engaged;
    means for supplying a pressurized gas to said air-bearing;
    a microinterferometer disposed within said chamber of said housing including a beam-divider cube, a fixed-cube-corner reflector and a movable cube-corner reflector mounted to move with said gauge probe, said fixed-cube-corner reflector and said movable cube-corner reflector mounted so that a laser beam directed into said beam-divider cube at a first point is divided to direct a first portion of said beam to said fixed-cube-corner reflector, the reflected first and second beam portions are directed to interferingly intersect at a second point in said beam-divider cube to form interference fringe patterns as said movable cube-corner reflector is moved by said probe in a gauging operation and divide said fringe patterns into first and second fields of view;
    a remote single frequency laser beam source;
    a self-focusing fiber-optic cable disposed for coherently transmitting said laser beam from said remote laser beam source into said housing and terminally mounted within said housing to provide said laser beam directed into said beam-divider cube at said first point;
    first and second fiber-optic output cables mounted in said first and second fields of view of said fringe patterns, respectively, for transmitting said fringe patterns from said housing;
    a quarter-wave plate mounted in the second field of view of said fringe patterns between said beam-divider cube and said second output cable is phase shifted one-quarter wave length from the pattern transmitted by said first output cable and;
    means responsive to the fringe patterns transmitted by said first and second output cables for determining the magnitude and direction of displacement of said probe.

2. The displacement transducer as set forth in claim 1 further including a vacuum retractor means for applying a vacuum to the chamber of said housing to retract said gauge probe.

3. The displacement transducer as set forth in claim 2 wherein said means for determining the magnitude and direction of displacement of said probe includes first and second remote photo-detectors connected to said first and second fiber-optic cables, respectively. for detecting said fringe patterns and generating ac signals at respective outputs in response to each fringed increment of displacement of said probe, a phase detector having first and second inputs connected to the outputs of said first and second photo detectors, respectively, for generating an output count pulse at an up line output when the signal from said first photodetector leads the signal from said second photo detector indicating a fringe increment of movement in a forward direction and generating an output count pulse at a down line output when the signal from said second photo-detector leads the signal from said first photo-detector indicating a fringe increment of movement in the reverse direction, and a bidirectional display counter having up and down count inputs connected to said up and down count line outputs, respectively, of said phase detector.

4. The displacement transducer as set forth in claim 3 wherein said laser beam source includes a Helium Neon laser and means for focusing and directing said laser beam into the remote end of said self-focusing fiber-optic cable.

* * * * *